US008127797B2

(12) United States Patent
Haugaard

(10) Patent No.: US 8,127,797 B2
(45) Date of Patent: Mar. 6, 2012

(54) CONSTRUCTION-KIT SYSTEM

(75) Inventor: Jens Laurvig Haugaard, Aarstev (DK)

(73) Assignee: Hydac Accessories GmbH, Sulzbach/Saar (DE)

( * ) Notice: Subject to any disclaimer, the term of this patent is extended or adjusted under 35 U.S.C. 154(b) by 1102 days.

(21) Appl. No.: 10/570,764

(22) PCT Filed: Aug. 27, 2004

(86) PCT No.: PCT/EP2004/009567

§ 371 (c)(1),
(2), (4) Date: Aug. 22, 2006

(87) PCT Pub. No.: WO2005/028878

PCT Pub. Date: May 31, 2005

(65) Prior Publication Data

US 2007/0199604 A1 Aug. 30, 2007

(30) Foreign Application Priority Data

Nov. 9, 2003 (DE) ................................. 103 43 330

(51) Int. Cl.
*F16K 11/00* (2006.01)

(52) U.S. Cl. ........................................................ 137/884

(58) Field of Classification Search ............. 137/515.65, 137/884

See application file for complete search history.

(56) References Cited

U.S. PATENT DOCUMENTS

| | | | | | |
|---|---|---|---|---|---|
| 3,513,876 | A | * | 5/1970 | Tarbox | 137/884 |
| 4,080,983 | A | | 3/1978 | Stumpmeier | |
| 4,230,143 | A | * | 10/1980 | Dettmann et al. | 137/884 |
| 4,723,576 | A | * | 2/1988 | Raymond | 137/884 |
| 4,726,393 | A | * | 2/1988 | Herner | 137/884 |
| 4,964,273 | A | * | 10/1990 | Nash | 137/884 |
| 2002/0038671 | A1 | | 4/2002 | Johnson | |

FOREIGN PATENT DOCUMENTS

| | | |
|---|---|---|
| DE | 25 23 951 | 12/1976 |
| DE | 27 50 035 | 10/1979 |
| DE | 199 21 436 | 11/2000 |
| DE | 199 34 574 | 2/2001 |
| DE | 101 15 913 | 10/2002 |
| EP | 0 854 982 | 7/1998 |

* cited by examiner

*Primary Examiner* — John Fox

(74) *Attorney, Agent, or Firm* — Roylance, Abrams, Berdo & Goodman, L.L.P.

(57) ABSTRACT

A construction-kit system includes at least one primary-valve block (10), with at least two groups of connection lines (12, 14) interconnected at one point (16) via a connection line of one of the groups (12) to form a fluidic connection. At least two additional connection lines of the one group (12) are respectively connected to a corresponding connection line of the other group (14). At least three dummy components (18) are connected in the connection lines of the other group (14) for the insertion of predetermined valve components. At least two additional dummy components (20) are connected between a common connection line (14*a*) of the other group (14) and an additional respective corresponding connection line (14*b*) of the other group (14).

13 Claims, 5 Drawing Sheets

CONSTRUCTION-KIT SYSTEM

FIELD OF THE INVENTION

The present invention relates to a construction-kit system having at least one primary valve block with at least two groups of connecting lines. All connecting lines are interconnected at one point by a connecting line of one group to conduct fluid.

BACKGROUND OF THE INVENTION

DE-OS 27 50 035 discloses a hydraulic module having small hydraulic elements interlinkable by their height and surface and performing pressure and/or quantity varying or distributing or controlling functions, and having a base block. The connection pattern of the elements and the base block are configured to be point symmetric, and are in the form of two connecting bores and two fastening bores. In addition, the elements and the base block are mounted in a predetermined pattern and/or sequence and to be rotated around the longitudinal axis through an angle of 180° relative to each other. A space-saving design is thereby obtained for the interlinkable hydraulic elements.

EP 0 854 982 B1 discloses a modular primary valve block of a valve system having pilot-controlled seat and/or piston valves. The primary valve block has both a standardized connection interface and a pilot valve interface for mounting of a pilot valve, and has a pump line, a tank line, a first operating line, a second operating line, a first control line, and a second control line. Four valve seats are mounted in the primary valve block, each for mounting one valve unit. The respective solution has proved to be suitable especially for cartridge technology in which valve units (cartridges) suitable for a particular application are mounted on the primary valve block.

DE 199 21 436 A1 discloses a hydraulic system for supplying a hydraulic consumer in motor vehicles which reduces the cost of designing different alternatives. In this disclosed hydraulic system, a pressure or hydraulic tank is provided in which a hydraulic fluid is stored and may be pressurized. All components of the hydraulic system configured as support housing are mounted so that they form a completely mountable assembly unit. The disclosed solution also has a hydraulic pump which delivers the hydraulic fluid from or to the pressure tank. An electric motor is provided for driving the hydraulic pump, as well as a control device for controlling operation of the electric motor. A pressure accumulator stores pressure in the form of potential energy, and applies this pressure to the hydraulic fluid of the pressure tank and the pump module in the interior of the pressure tank. The other modules are mounted externally on the pressure tank. The disclosed configuration of a hydraulic system provides a modular system by which a plurality of functions may be performed.

These disclosed solutions are not, however, suitable for meeting the increasingly complex system requirements set for hydraulic systems. The control expenditures for such hydraulic control units and associated assembly components has increased. More and more individual solutions are being sought rather than modular concepts, since the disclosed modules or components as supplements to a hydraulic module normally do not sufficiently justify the increased system and control expenditures.

SUMMARY OF THE INVENTION

An object of the present invention is to provide an improved modular system which may be produced in a cost-effective and space-saving manner, and which is reliable in operation and meets the increasingly rigorous requirements set for the complexity of functions potentially assigned for a hydraulic system as a whole.

This object is basically attained by a modular system having at least two additional connecting lines of one group connected to an associated connecting line of another group of a primary valve block. At least three dummy components are connected to the connecting lines of the other group for use of specified valve components. At least two other dummy components are connected between a common connecting line of the other group and another associated connecting line of this other group. A dummy component solution is provided on the basis of the primary valve block as main component of the modular system. The dummy component permits use, as a function of the function assigned to the system and as a function of the components otherwise to be built into the modular system. Individual valve components for each dummy component then as a whole, together with the other components, perform the function assigned to the system. The dummy components, in conjunction with the connecting lines for the primary valve block, configure a sort of matrix structure having transverse and longitudinal rows. The dummy component solution of the present invention, together with the matrix-like connection structure, permits performing a decidedly large number of system functions. The resulting solution is space-saving in its structure and accordingly cost-effective in production, as well as reliable in operation. Once primary valve blocks are in operation as basic system for the hydraulic module, they may easily be modified on the spot should modified system functions make this necessary.

Preferably, at least one dummy component of a valve component remains unoccupied or blocks the respective fluid-conducting path of one or more connecting lines of one or the other group or forms a fluid-conducting path between connecting lines of the other group. While the other dummy components accordingly are occupied by valve components, the dummy component which remains free permits appropriate fluid control inside the primary valve block as determined by the function assigned to the system.

In a preferred embodiment of the modular system of the present invention, the primary valve block has on the outer circumference side connecting points for optional or partly common connection of other components such as pressure gauges, hydraulic pumps, cooler and/or filter units, hydraulic accumulators, other valve components, hydraulic tanks, electric and electronic control components including sensors and switching magnets, as well as at least one intermediate or secondary connection block. Hence, not only for integral valve components inside the primary valve block to be used, but also for it to be possible to connect to the primary valve block more extensive components mounted on the outer circumference side, the variability of the primary valve block is perceptibly increased, while the primary valve block system component remains compact. By preference, the intermediate or secondary connection block is provided with additional dummy components. Such components as pressure control valves, return valves, controlled switching valves, etc. can then be used as valve components for the dummy components. Their selection is based primarily on the respective assigned system function.

In one especially preferred embodiment of the modular system of the present invention, the hydraulic tank is designed as a module and may be selected from among a large number of hydraulic tanks having the respective connection points for the purpose of complementation by the other components of the module. Different tanks volumes are selected in specified stages. It has been found to be especially advantageous to provide hydraulic tanks with capacities of 25, 50, 100, 150, and 200 liters. Such tanks have been designed so that they fit one within the other and may be placed on half of a EURO pallet for shipping purposes.

One aspect of the modular system concept is that it permits complete delivery of system components, in particular a hydraulic tank, hydraulic pump with associated electric motor, valve blocks with pressure, direction, and flow valves, including filter units, hydraulic accumulators, oil coolers, air coolers, and accessories. As regards the modular construction, the user retains the option of obtaining all components from a single manufacturer or, as a backup measure, obtaining them from other manufacturers. Consequently, the modular system of the present invention provides a solution to a great extent permitting user-specific complementing of total hydraulic systems.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
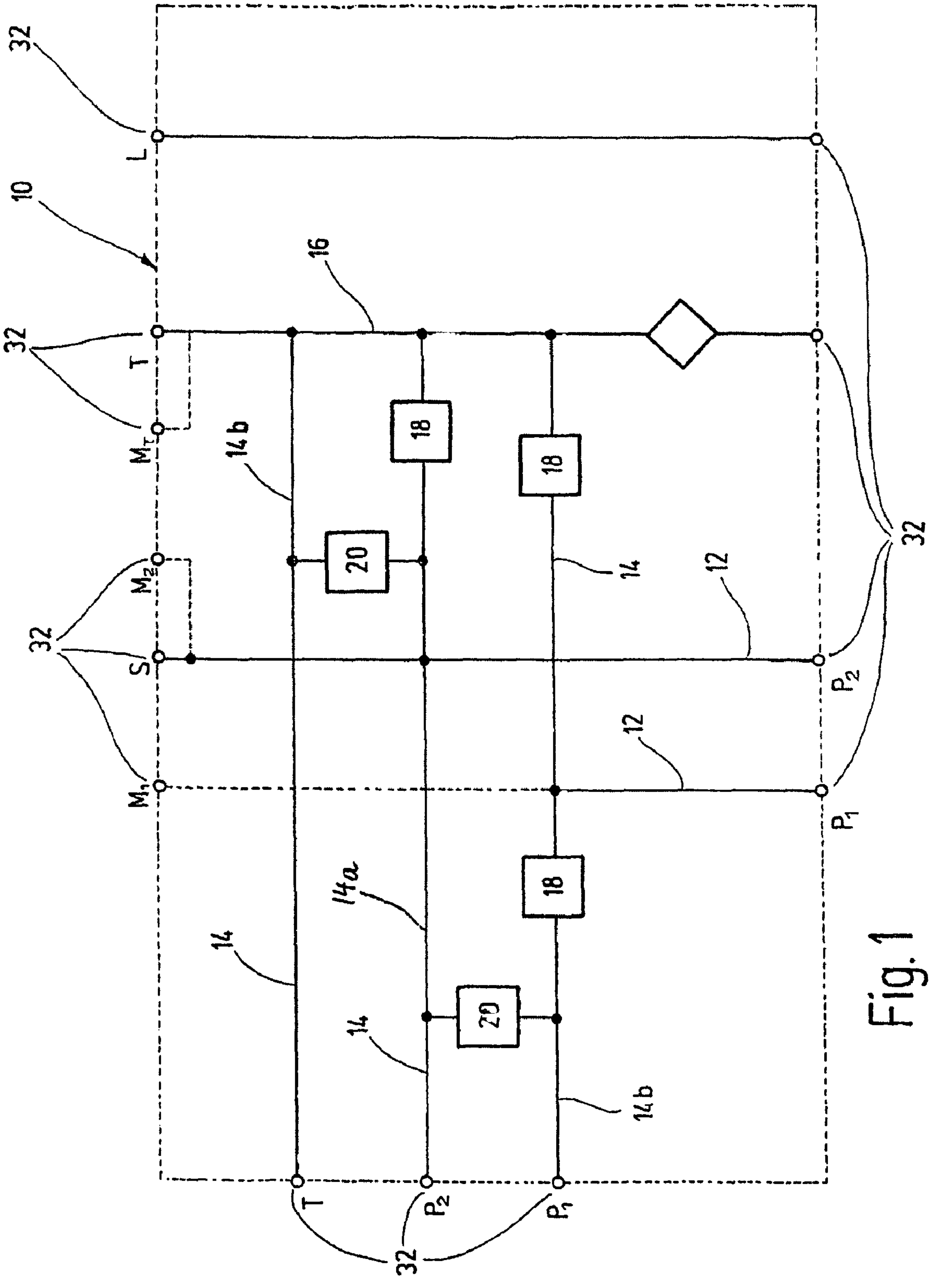
FIG. 1 is a diagrammatic, block diagram of a modular system according to a first embodiment of the present invention.
Figure 2:
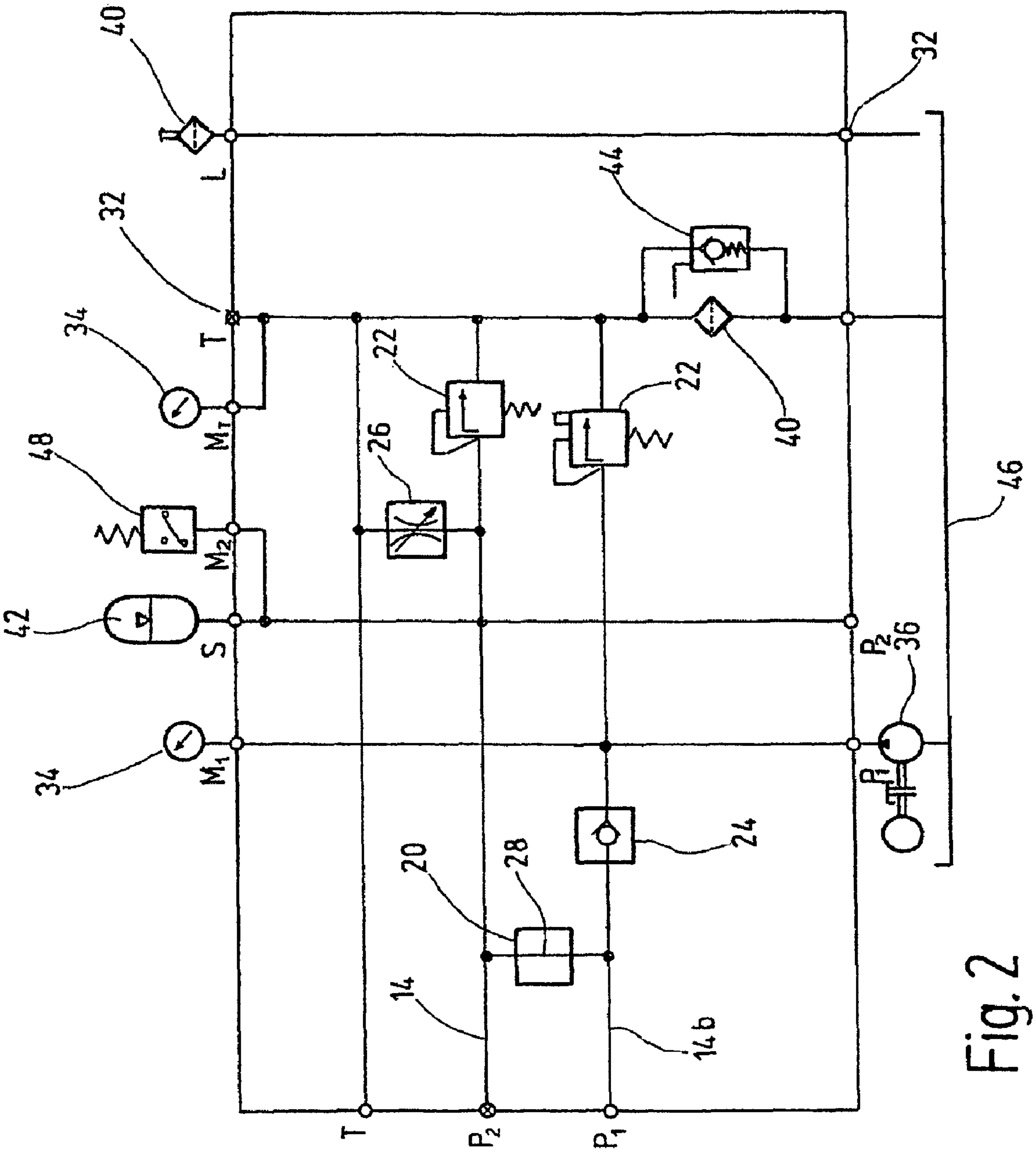
FIG. 2 is a diagrammatic, block diagram of a modular system according to a second embodiment of the present invention.

FIG. 1 illustrates a connection diagram of a primary valve block 10 having at least two groups 12, 14 of connecting lines, all interconnected at one point by a connecting line 16 of one or a first group 12 so as to conduct fluid. At least two other connecting lines of this one group 12 are connected to an associated connecting line of the other or second group 14. At least three dummy components 18 are connected to the connecting lines of the other group 14 for use of specified valve components. At least two other dummy components 20 are switched between a common connecting line 14*a* of the other group 14 and another associated connecting line 14*b* of this other group 14.

On the basis of the basic concept shown in FIG. 1, FIGS. 2 to 4, also in diagram form, illustrate various embodiments of hydraulic solutions, ones in which the dummy components 18, 20 are occupied by or comprise valve components. Thus, the circuitry solution illustrated in FIG. 2 has, for each of the two dummy components 18 on the right as viewed in that figure, a pressure control valve 22. In the left half of FIG. 2, the dummy component 18 is occupied by a return valve 24. The dummy component 20 on the right is provided with an adjustable choke 26. The other dummy component 20 on the very left permits establishment of a fluid-conducting path 28 between connecting lines 14 and 14*b* of the other group.

Figure 3:
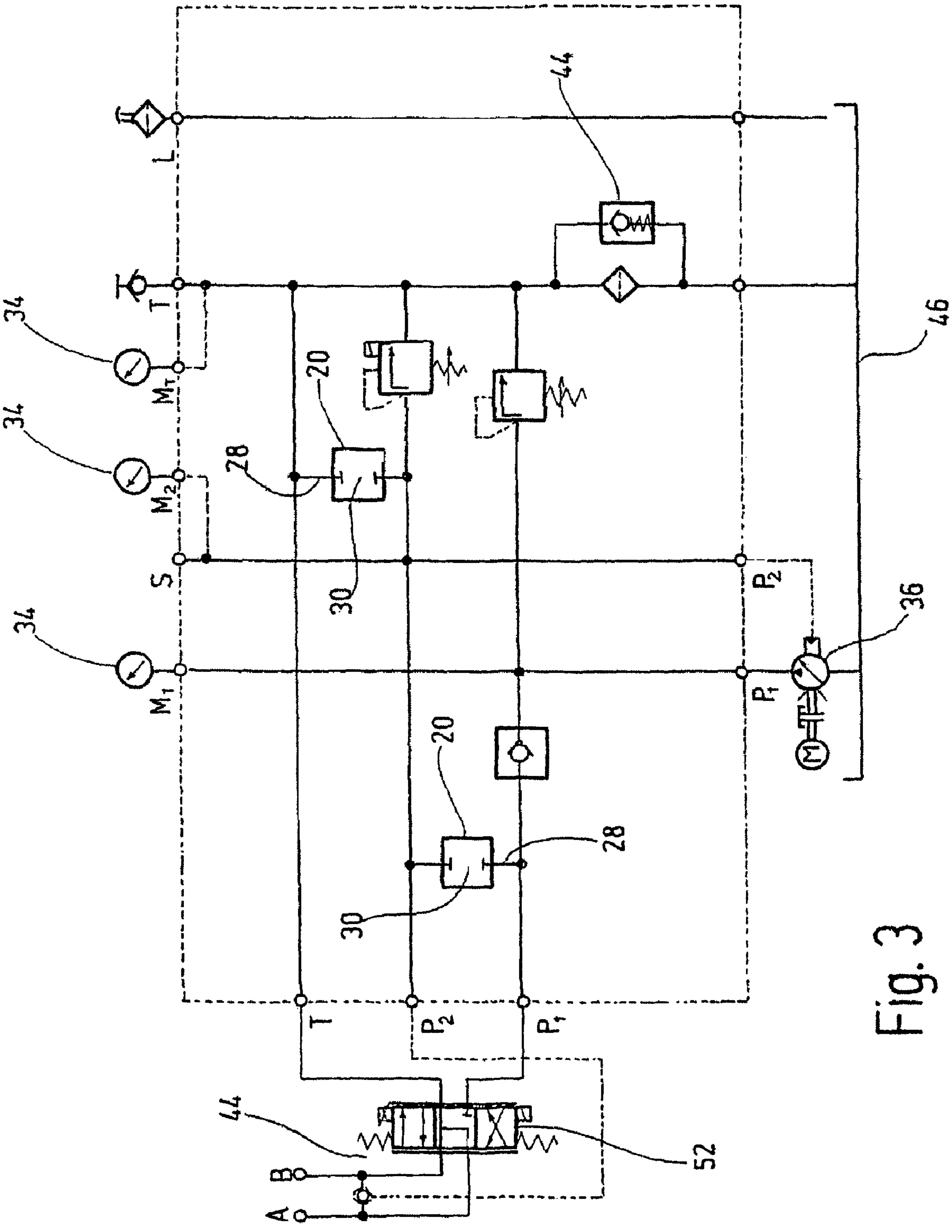
FIG. 3 is a diagrammatic, block diagram of a modular system according to a third embodiment of the present invention.

In a correspondingly modified embodiment shown in FIG. 3, the respective dummy components 20 may also be provided with a device 30 blocking the fluid path 28. Alternatively, in an embodiment not shown, a respective dummy component 18, but preferably a dummy component 20, may also remain entirely unoccupied, depending on the total hydraulic system it is desired to produce.

Figure 4:
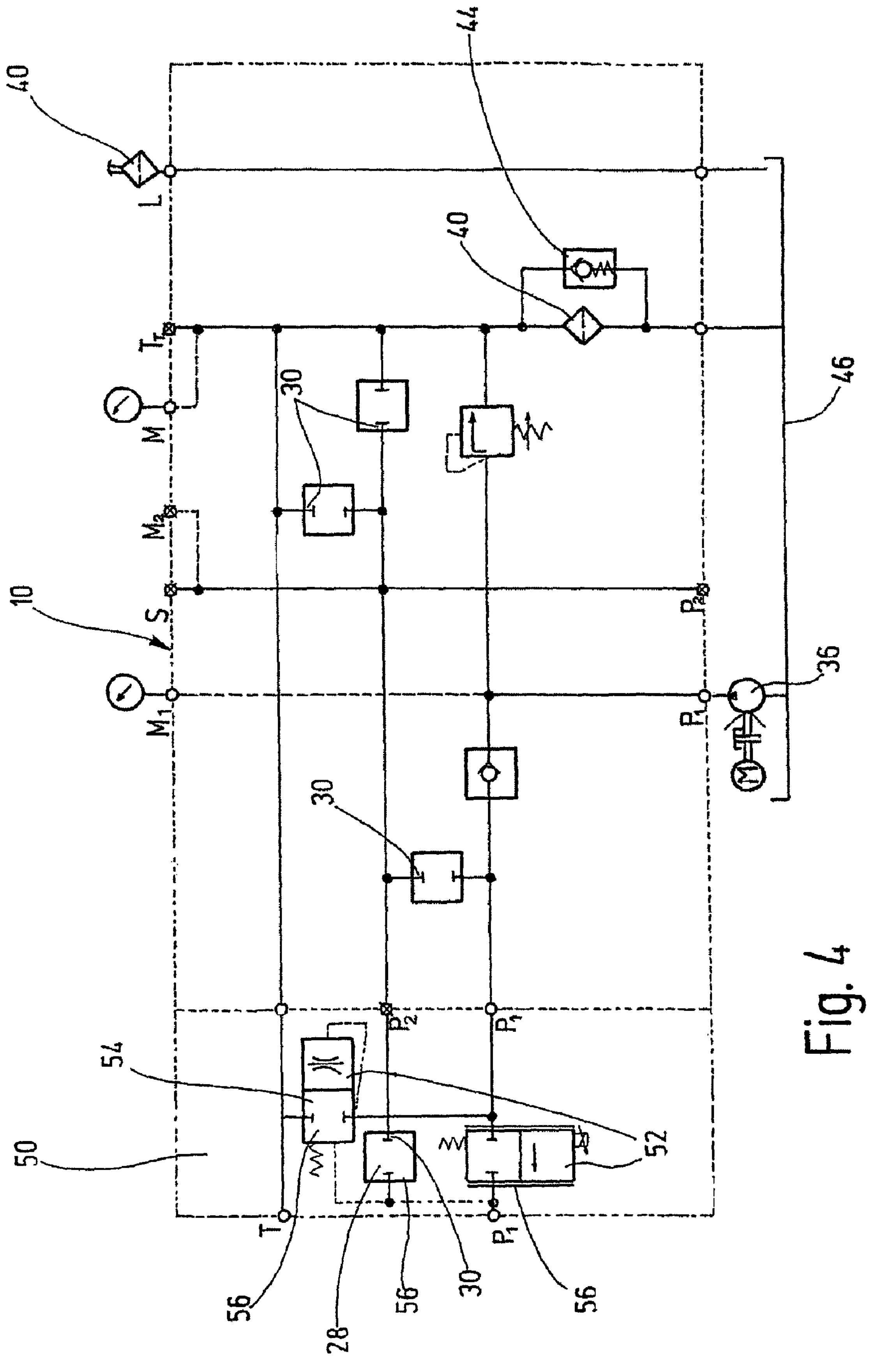
FIG. 4 is a diagrammatic, block diagram of a modular system according to a fourth embodiment of the present invention.

In addition, the primary valve block has on its external circumference side connecting points 32 (see FIG. 1) for optional or partly common connection of additional components, such as pressure gauges 34, hydraulic pumps 36 with electric drive 60, cooler units 38 (see FIG. 5), filter units 40, hydraulic accumulators 42, other valve components 44, hydraulic tanks 46, electric and electronic control components 48 (see FIG. 2), and at least one intermediate or secondary connection block 50 (see FIG. 4). As the individual circuit diagrams show, the respective dummy component 18, 20 may have valve components such as pressure control valves 22, return valves 24, chokes 26, or diaphragms and switching valves 52, such as ones for example in the form of the 4/3-way valve shown in FIG. 3, or components in the form of pressure scales 54 (see FIG. 4).

As is to be seen in FIG. 4 in particular, the primary valve block 10 is combined with an intermediate or secondary connection block 50 appropriately mounted on one of its front sides. The respective intermediate or secondary connection block 50 is provided with additional dummy components 56 in which, in turn, appropriate valve components may also be mounted as already explained, as a function of the solution for the respective system task. In addition, it has been found to be advantageous for the sake of a reliably operating and compact design, such as that illustrated by the basic circuitry in FIG. 1, to assemble the respective dummy components 18, 20 of the primary valve block 10 in function groups, one in a group of two and one in a group of three, spatially separated from connecting lines of the one group 12. The function group on the left as viewed in FIG. 1 has one dummy component 18 and an additional dummy component 20, while the function group on the right has two dummy components 18 and one additional dummy component 20. In another embodiment (not shown) the circuits are provided with six dummy components, and division by integral multiples of dummy components is effected.

Figure 5:
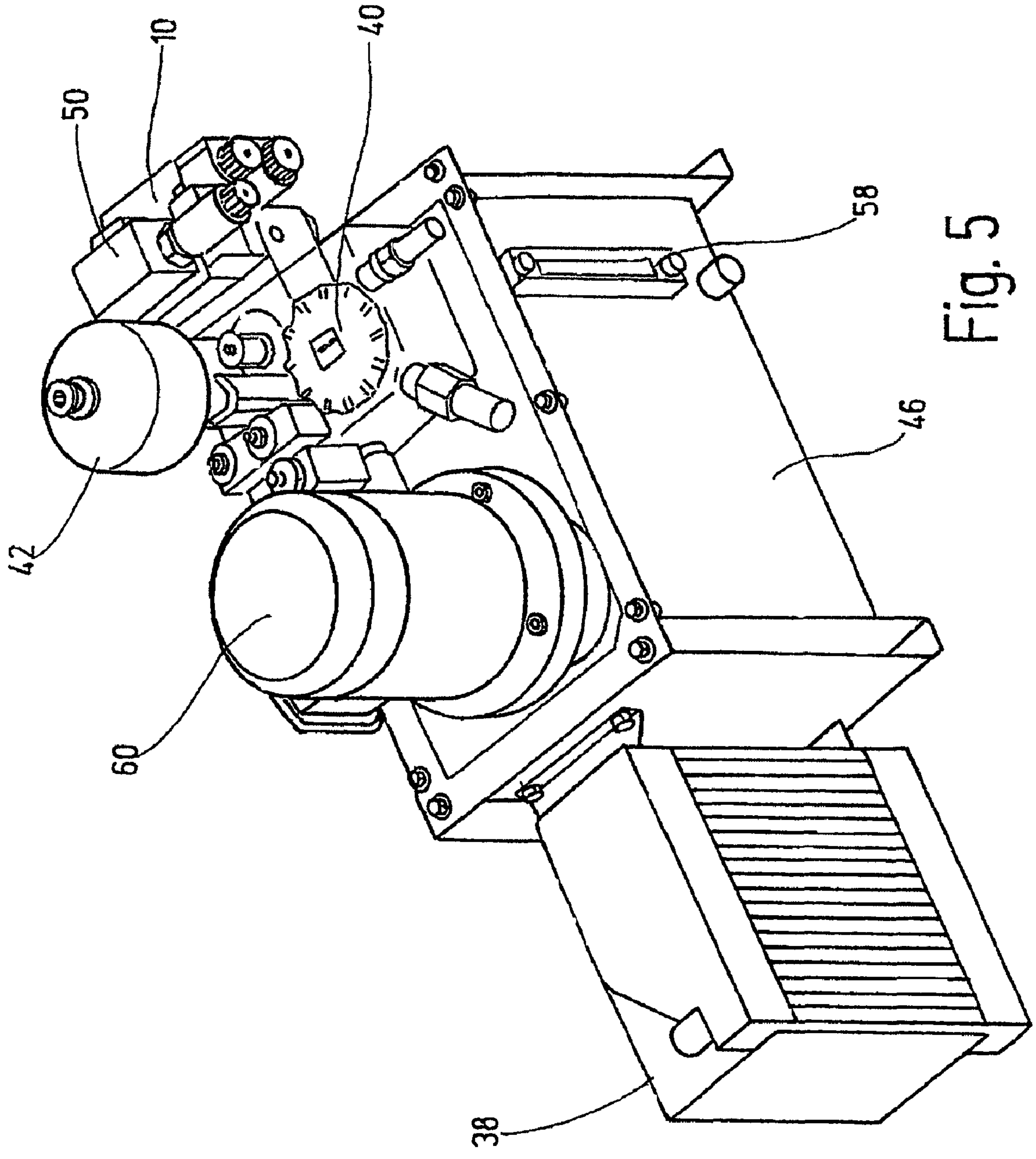
FIG. 5 is a perspective top view of a hydraulic system of individual modular components according to the present invention.

The illustration in FIG. 5 presents a hydraulic system having a plurality of modular components as already described. The basic housing element is represented by the hydraulic tank 46, which as a module is made up at option of a plurality of hydraulic tanks with the connecting points indicated (not shown) for complementation with the other components of the module. The hydraulic tanks have different tank volumes (fitting on EURO pallets) selected at option in specified stages. The hydraulic tank 46 has, as accessory 58 on its front side facing the observer, a level indicator. On the top side, the electric motor 60 is mounted which drives the hydraulic pump 36 extending into the tank 46. The cooler unit 48 is mounted on another frontal side of the hydraulic tank. The primary valve block 10 and the intermediate and secondary connection block 50 with various switching valves are mounted on the top side of the hydraulic tank 46 beside the hydraulic accumulator 42.

The modular system shown in FIG. 5 may accordingly be delivered as requested by the customer and in the form of individual components. A customer may order such user-specific components from third-party manufacturers, and then produce a total hydraulic system in accordance with the customer's own guidelines and quality concepts.

While various embodiments have been chosen to illustrate the invention, it will be understood by those skilled in the art that various changes and modifications can be made therein without departing from the scope of the invention as defined in the appended claims.

What is claimed is:

1. A modular hydraulic system, comprising:

at least one primary valve block;

at least first and second groups in the primary valve block of connecting lines all connected in fluid communication at one point by a connecting line of said first group;

at least two other connecting lines of said first group being connected in fluid communication to a respective connection line of said second group;

at least three first dummy components for receiving definable valve components connected to the connecting lines of said second group; and at least two second dummy components connected between a common connecting line of said second group and another associated connecting line of said second group.

2. A modular hydraulic system according to claim 1 wherein at least one of said dummy components is one of unoccupied by a valve component, blocking a respective fluid-conducting path of at least one connecting line of the first and second groups and forming a fluid-conducting path between connecting lines of said second group.

3. A modular hydraulic system according to claim 1 wherein said primary valve block comprises external circumference side connecting points for optional and partial common connection of additional components.

4. A modular hydraulic system according to claim 3 wherein one of said additional components comprises a hydraulic tank module having a plurality of tank parts with connecting points for connection to other components.

5. A modular hydraulic system according to claim 4 wherein said tank parts have varied volumes.

6. A modular hydraulic system according to claim 3 wherein said additional components are selected from the group consisting of pressure gauges, hydraulic pumps, cooler units, filter units, hydraulic accumulators, additional valve components, hydraulic tanks, electric and electronic control components including sensors and switching magnets, and at least one secondary connection block.

7. A modular hydraulic system according to claim 6 wherein said secondary connection block comprises additional dummy components.

8. A modular hydraulic system according to claim 7 wherein said additional dummy components are selected from the group consisting for switching valves, pressure control valves and valves functioning as a pressure scale.

9. A modular hydraulic system according to claim 8 wherein said switching valves comprise one of a 2/2-way switching valve and a 3/2-way switching valve.

10. A modular hydraulic system according to claim 1 wherein said first dummy components receive valve components.

11. A modular hydraulic system according to claim 10 wherein said valve components are selected from the group consisting of pressure control valves, return valves, chokes and diaphragms.

12. A modular hydraulic system according to claim 1 wherein said first and second dummy components are arranged in function groups spatially separated from the connecting lines of said first group.

13. A modular hydraulic system according to claim 12 wherein said first and second dummy components are arranged in the function groups of one of two and three.

* * * * *